O. M. TAYLOR.
BRAKE.
APPLICATION FILED APR. 16, 1910.
968,893.
Patented Aug. 30, 1910.
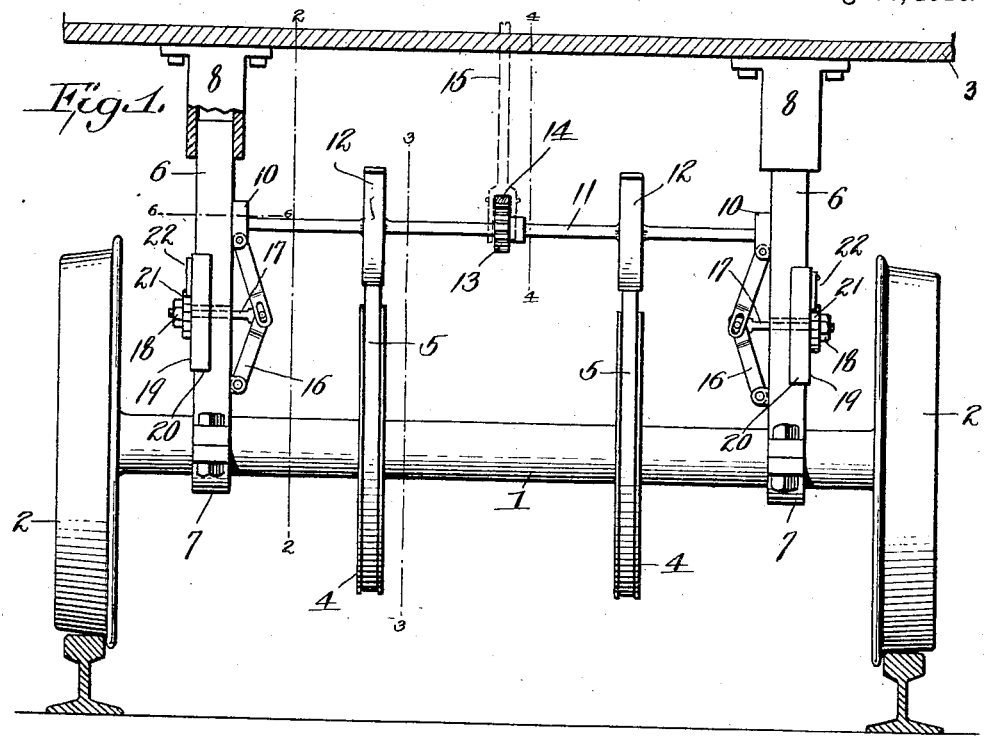
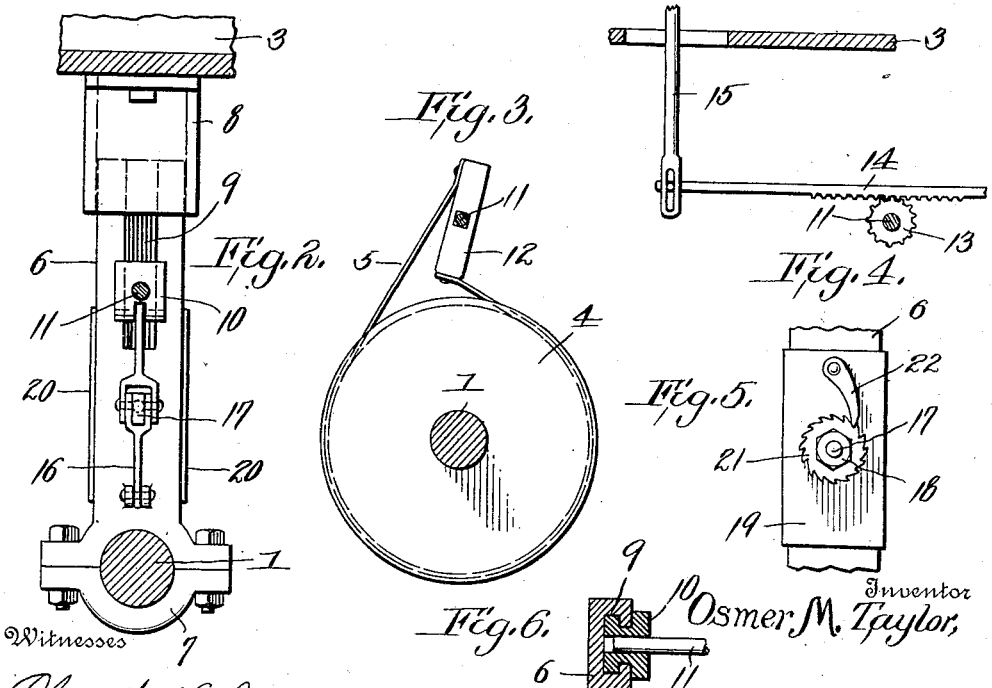
Witnesses
Olive W. Holmes
Harriet B. Cornwall
Inventor
Osmer M. Taylor,
By
Attorney
THE NORRIS PETERS CO., WASHINGTON, D. C.

UNITED STATES PATENT OFFICE.

OSMER M. TAYLOR, OF ALBION, PENNSYLVANIA.

BRAKE.

968,893.  Specification of Letters Patent.  Patented Aug. 30, 1910.

Application filed April 16, 1910. Serial No. 555,847.

*To all whom it may concern:*

Be it known that I, OSMER M. TAYLOR, citizen of the United States, residing at Albion, in the county of Erie and State of Pennsylvania, have invented certain new and useful Improvements in Brakes, of which the following is a specification.

The present invention relates to certain new and useful improvements in the construction of brakes of that type which comprise a brake disk having the periphery thereof frictionally engaged by a strap, and which are commonly employed upon railway cars, vehicles, and the like.

One of the objects of the invention is the provision of a brake of this character embodying novel means whereby compensation may be made for the wearing away of the brake disk, thereby obviating the necessity of replacing worn parts or of providing the car with an entirely new brake mechanism.

The invention further contemplates a brake which is comparatively simple and inexpensive in its construction, which can be readily adjusted to compensate for the wear of the brake disks, and which will successfully withstand the hard usage to which such devices are subjected when in operation.

With these and other objects in view the invention consists in certain combinations and arrangements of the parts as will more fully appear as the description proceeds, the novel features thereof being pointed out in the appended claims.

For a full understanding of the invention, reference is to be had to the following description and accompanying drawing, in which:

Figure 1 is an end view of a car having the improved brake mechanism applied thereto, parts being broken away and shown in section. Fig. 2 is a vertical sectional view on the line 2—2 of Fig. 1. Fig. 3 is a similar view on the line 3—3 of Fig. 1. Fig. 4 is also a similar view on the line 4—4 of Fig. 1. Fig. 5 is a detail view of the washer plate and nut, and Fig. 6 is a horizontal sectional view on the line 6—6 of Fig. 1.

Corresponding and like parts are referred to in the following description and indicated in all the views of the drawing by the same reference characters.

Specifically describing the present embodiment of the invention, the numeral 1 designates a car axle which is provided at its extremities with the usual wheels 2, the car floor being indicated at 3. A pair of brake disks 4 are rigidly applied to the axle 1 and have the peripheries thereof grooved to receive the brake straps 5. Standards 6 extend upwardly from opposite ends of the axle 1, the lower end of each of the standards being formed with a bearing 7 through which the axle extends, while the upper end of each of the standards telescopes within a tubular guide member 8 secured to the floor 3 of the car. This telescoping action enables the car body to move up and down with respect to the car axle as permitted by the usual springs which are interposed between the axle and the car. The inner face of each of the standards 6 is provided at the upper end thereof with a T shaped slot 9 within which a slide 10 is mounted, the said slides having a brake shaft 11 journaled therein. This brake shaft is spaced from and parallel to the axle 1 and has the brake levers 12 rigidly applied thereto at points immediately over the brake disks 4, the extremities of the brake straps 5 being secured to the ends of the respective brake levers. It will thus be obvious that when the brake shaft is turned in one direction the straps 5 will be drawn tightly around the brake disks so as to frictionally engage the same and retard the turning of the axle, while when the brake shaft is turned in the opposite direction the straps will be loose upon the brake disks and will not interfere with the turning of the axle.

Any suitable means may be provided for turning the brake shaft 11, and in the present instance, the said brake shaft is shown as provided with pinions 13 engaged by a rack bar 14 which has one end thereof connected to an operating lever 15, the said operating lever extending up through the floor of the car so as to be readily manipulated by the motorman or other person in charge of the car. For the purpose of holding the slides 10 in proper position, toggle levers 16 may be utilized, the upper end of each set of toggle levers being pivotally connected to the respective slide, while the lower end of each set of toggle levers is pivotally connected to the respective standard. A bolt 17 is connected to each set of toggle levers at the joint thereof and passes through a slot in the adjacent standard 6, the end of the bolt having a nut 18 applied thereto. A washer plate 19 is interposed between each of the nuts 18 and the standards 6 and has the edges thereof bent around the sides of the standard as indicated at 20 so that the nut is free to slide up and down upon the standard but can not rotate about the bolt.

Any suitable means may be provided for locking the nuts 18 against turning, and in the present instance each of these nuts is shown as formed with a ratchet 21 adapted to be engaged by a pawl 22 pivoted upon the washer plate 19.

With this construction, it will be apparent that when the brake disks 4 become worn to such an extent that the brake levers 12 no longer operate to draw them tightly around the brake disk, it is merely necessary to tighten the nuts 18, thereby drawing the bolts 17 inwardly and causing the toggle levers 16 to move the slides 10 away from the axle. The distance between the brake shaft 11 and the axle 1 is thereby slightly increased, and the straps 5 can then be drawn tightly around the brake disks by the usual movement of the brake shaft 11.

While I have described and illustrated one embodiment of the invention, it will be understood that I do not restrict myself to the exact construction disclosed, since minor changes and alterations can be made without departing in any manner from the spirit of the invention.

Having thus described the invention, what I claim as new and desire to secure by Letters Patent, is:

1. The combination of an axle, a brake disk rigid with the axle, a brake shaft spaced from the axle, a brake lever rigid with the brake shaft, a strap extending around the brake disk and connected to the ends of the brake lever, means for turning the brake shaft for causing the strap to grip or release the brake disk, and means for varying the distance between the brake shaft and the axle.

2. The combination of an axle, a brake disk rigid with the axle, a pair of standards projecting from the axle, slides mounted upon the standards, a brake shaft journaled upon the slides, means for holding the slides in an adjusted position, a brake lever rigid with the brake shaft, a strap extending around the brake disk and connected to the brake lever, and means for turning the brake shaft.

3. The combination of an axle, a brake disk rigid with the axle, a pair of standards projecting from the axle, slides mounted upon the standards, toggle levers for holding the slides in an adjusted position, a brake shaft journaled upon the slides, a brake lever rigid with the brake shaft, a strap extending around the brake disk and connected to the brake lever, and means for turning the brake shaft.

4. The combination of an axle, a brake disk rigid with the axle, standards projecting from the axle, slides mounted upon the standards, a brake shaft journaled upon the slides, toggle levers connected to the slides and to the standards, bolts connected to the joints of the toggle levers and extending through the respective standards, nuts applied to the bolts, a brake lever rigid with the brake shaft, a strap extending around the brake disk and connected to the brake lever, and means for turning the brake shaft.

5. The combination of an axle, a car body yieldably mounted with regard to the axle, standards projecting from the axle, guide members applied to the car body and having a sliding connection with the standards, a brake shaft carried by the standards, means for turning the brake shaft, and means operated by the brake shaft for retarding the rotation of the axle.

6. The combination of an axle, a car body yieldably mounted with regard to the axle, standards projecting from the axle, guide members carried by the car body and having a sliding engagement with the standards, slides mounted upon the standards, means for holding the slides in an adjusted position, a brake shaft journaled upon the slides, means for turning the brake shaft, and means operated by the brake shaft for retarding the rotation of the axle.

7. The combination of an axle, a car body yieldably mounted with regard to the axle, standards projecting from the axle, guide members applied to the car body and having a sliding connection with the standards, slides mounted upon the standards, toggle levers for holding the slides in an adjusted position, a brake shaft journaled upon the slides, means for turning the brake shaft, and means operated by the brake shaft for retarding the rotation of the axle.

8. The combination of an axle, standards projecting from the axle, slides mounted upon the standards, toggle levers for holding the slides in an adjusted position, a brake shaft journaled upon the slides, means for turning the brake shaft, and means operated by the brake shaft for retarding the rotation of the axle.

In testimony whereof I affix my signature in presence of two witnesses.

OSMER M. TAYLOR.

Witnesses:
S. A. MORRISON,
C. A. GRIFFIS.